United States Patent
Isaac et al.

(10) Patent No.: US 7,644,226 B1
(45) Date of Patent: Jan. 5, 2010

(54) SYSTEM AND METHOD FOR MAINTAINING RAM COMMAND TIMING ACROSS PHASE-SHIFTED TIME DOMAINS

(75) Inventors: Roger Isaac, Santa Clara, CA (US); Stephan Rosner, Campbell, CA (US); Qamrul Hasan, Santa Clara, CA (US)

(73) Assignee: Spansion LLC, Sunnyvale, CA (US)

( * ) Notice: Subject to any disclaimer, the term of this patent is extended or adjusted under 35 U.S.C. 154(b) by 392 days.

(21) Appl. No.: 11/642,412

(22) Filed: Dec. 19, 2006

(51) Int. Cl.
*G06F 12/00* (2006.01)
(52) U.S. Cl. .................... 711/105; 711/104; 710/5
(58) Field of Classification Search .......... 711/104, 711/105; 710/5
See application file for complete search history.

(56) References Cited

U.S. PATENT DOCUMENTS

| | | | |
|---|---|---|---|
| 6,959,016 B1 * | 10/2005 | Keeth et al. | 370/517 |
| 7,085,880 B2 * | 8/2006 | Johnson | 711/105 |
| 7,251,711 B2 * | 7/2007 | Roohparvar | 711/154 |
| 2004/0059840 A1 * | 3/2004 | Perego et al. | 710/6 |
| 2007/0121399 A1 * | 5/2007 | Bains | 365/203 |

* cited by examiner

*Primary Examiner*—Christian P Chace
*Assistant Examiner*—Hashem Farrokh
(74) *Attorney, Agent, or Firm*—Farjami & Farjami LLP

(57) ABSTRACT

According to one exemplary embodiment, a RAM employing system includes a RAM and a RAM controller coupled to the RAM. The RAM employing system further includes a command queue, which is configured to receive time encoded RAM commands from the RAM controller. The RAM is configured to retrieve, decode, and execute each of the time encoded RAM commands in the command queue.

15 Claims, 4 Drawing Sheets

SYSTEM AND METHOD FOR MAINTAINING RAM COMMAND TIMING ACROSS PHASE-SHIFTED TIME DOMAINS

TECHNICAL FIELD

The present invention relates generally to the field of semiconductor devices. More particularly, the present invention relates to semiconductor memory devices.

BACKGROUND ART

Conventional systems utilizing a random access memory (RAM) (also referred to as a "system with RAM" or a "RAM employing system" in the present application), such as those including a dynamic random access memory (DRAM), typically have tight timing coupling, i.e., a known clock relationship, between the RAM and the RAM controller. In such systems having tight timing coupling, a single time domain exists between the RAM and the RAM controller, which allows the RAM controller to accurately track the status of the RAM on a per cycle basis to optimize the performance of the RAM. As such, the RAM controller can issue a sequence of RAM commands to the RAM in optimal order and with specific timing.

However, when conventional RAM employing systems are used with, for example, low-pin-count high performance systems, tight timing coupling between the RAM and the RAM controller may not be possible. More specifically, since low-pin-count high performance systems typically utilize buses that rely on flow control and loose timing coupling, the relationship between the clock of the RAM and the clock of the RAM controller will typically be unknown and difficult to determine. Therefore, in such systems utilizing loose timing coupling, a phase-shift results between the time domain of the RAM and the time domain of the RAM controller. Consequently, the specific timing of the RAM commands issued by the RAM controller to the RAM may not be maintained across the phase-shifted time domains, causing inaccurate or poor execution of RAM commands by the RAM.

Accordingly, there exists great need in the art for a RAM employing system that can be used with RAM controllers across multiple phase-shifted time domains, without sacrificing the RAM performance.

SUMMARY

The present invention addresses and resolves the need in the art for a system and method for maintaining random access memory (RAM) command timing across phase-shifted time domains.

According to one exemplary embodiment, a RAM employing system includes a RAM and a RAM controller coupled to the RAM. The RAM can be, for example, a dynamic random access memory (DRAM). The RAM employing system further includes a command queue, which is configured to receive a number of time encoded RAM commands from the RAM controller. In the present embodiment, the command queue is included in the RAM. The command queue can be, for example, a first-in, first-out (FIFO) queue. In another embodiment, the RAM controller can transfer the number of time encoded RAM commands directly into the command queue.

The RAM is configured to retrieve, decode, and execute each of the number of time encoded RAM commands in the command queue. In another embodiment, the time encoded RAM commands are transferred to the command queue using a flow controlled bus, such that a phase-shift results between the time domain of the RAM and the time domain of the RAM controller. Each of the number of time encoded RAM commands in the command queue is encoded with timing information relative to an immediately preceding RAM command in the number of time encoded RAM commands. The timing information is then decoded to determine an execution delay period between the execution of the time encoded RAM command and an immediately preceding time encoded RAM command. In another embodiment, the execution delay period is loaded into a counter to provide the required execution delay period. In yet another embodiment, multiple unknown time domains exist between the time domain of the RAM controller and the time domain of the RAM.

Other features and advantages of the present invention will become more readily apparent to those of ordinary skill in the art after reviewing the following detailed description and accompanying drawings.

DETAILED DESCRIPTION OF THE INVENTION

The present invention is directed to a system and method for maintaining RAM command timing across phase-shifted time domains. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed description are directed to merely exemplary embodiments of the invention. To maintain brevity, other embodiments of the present invention are not specifically described in the present application and are not specifically illustrated by the present drawings.

Figure 1:
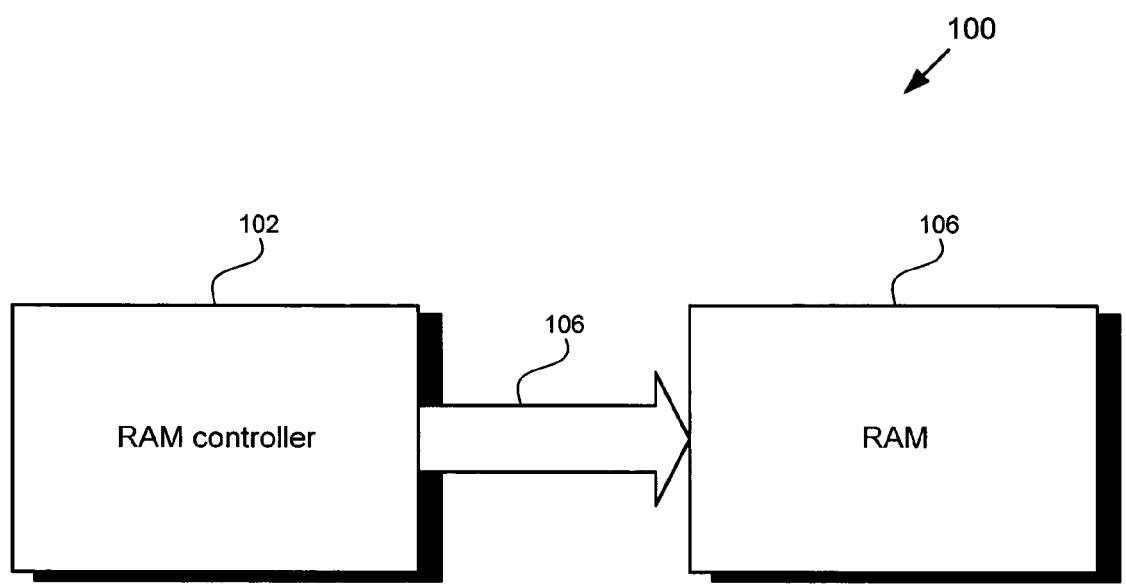
FIG. 1 depicts a circuit diagram of a conventional RAM employing system.

FIG. 1 shows conventional random access memory (RAM) employing system 100. As shown in FIG. 1, conventional RAM employing system 100 includes RAM controller 102 and RAM 104. As also shown in FIG. 1, RAM controller 102 is coupled to RAM 104 via control bus 106. RAM employing system 100 has tight timing coupling, i.e., a known clock relationship, between RAM 104 and RAM controller 102. For example, a known clock relationship can be established between RAM 104 and RAM controller 102 by using the same clock to control both RAM 104 and RAM controller 102. Therefore, in RAM employing system 100, a single time domain exists between RAM 104 and RAM controller 102.

RAM controller 102 can issue a sequence of RAM commands to RAM 104 across control bus 106. Typically, this sequence of RAM commands is issued by RAM controller 102 in optimal order, such that when a first RAM command is issued to RAM 104, a second RAM command is issued with a specific timing that relates to the end of the execution of the first RAM command. For example, if the first RAM command issued by RAM controller 102 requires 3 clock cycles to execute, RAM controller 102 will issue the second RAM command following a 3 clock cycle delay to allow RAM 104 the required time to execute the fist RAM command.

Figure 2:
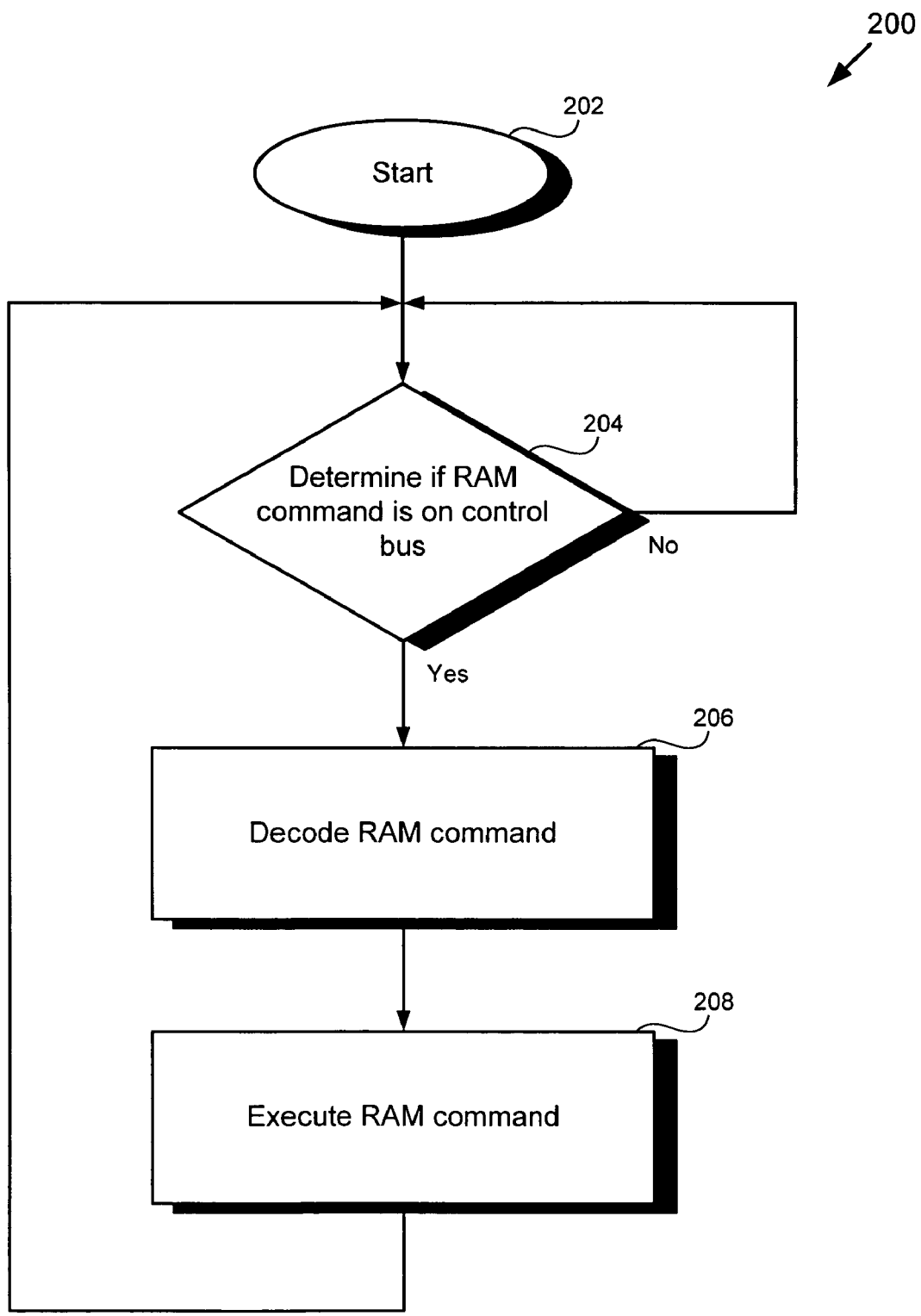
FIG. 2 depicts a flow chart showing a memory operation for the conventional RAM employing system of FIG. 1.

An exemplary memory operation for conventional RAM employing system 100 in FIG. 1 is represented by flow chart 200 of FIG. 2. At step 202 of flowchart 200, the exemplary memory operation begins. First at step 202, conventional RAM employing system 100 is powered up to start RAM 104 shown in FIG. 1. Thereafter, at decision step 204, RAM 104 determines whether a RAM command issued by RAM controller 102 is available on control bus 106. If a RAM command is available on control bus 106, then step 206 is carried out; otherwise, step 204 is repeated until a RAM command is available on control bus 106. At step 206, RAM 104 decodes the RAM command. Thereafter, at step 208, RAM 104 executes the RAM command and returns to decision step 204.

As discussed above, in conventional RAM employing system 100, a single time domain exists between RAM controller 102 and RAM 104, thus providing tight timing coupling between RAM controller 102 and RAM 104. As such, RAM controller 102 is able to accurately track the status of RAM 104 at each clock cycle, allowing RAM controller 102 to optimize the performance of RAM 104 by issuing each RAM command in a sequence of RAM commands precisely after the execution of an immediately preceding RAM command. Therefore, the order and specific timing of the RAM commands issued by the RAM controller are critical for optimized RAM performance.

However, in systems where tight timing coupling between the RAM controller and the RAM is not possible, such as in low-pin-count high performance systems where the RAM controller is coupled to the RAM through buses relying on flow control and loose timing coupling, a single time domain may not exist between the RAM controller and the RAM. In such systems utilizing loose timing coupling, a phase-shift results between the time domain of the RAM controller and the time domain of the RAM. The phase-shift is typically fixed, but difficult to determine. Consequently, the specific timing of the RAM commands issued by the RAM controller may not be maintained across the phase-shifted time domains of the RAM controller and the RAM, resulting in inaccurate execution of RAM commands by the RAM.

Figure 3:
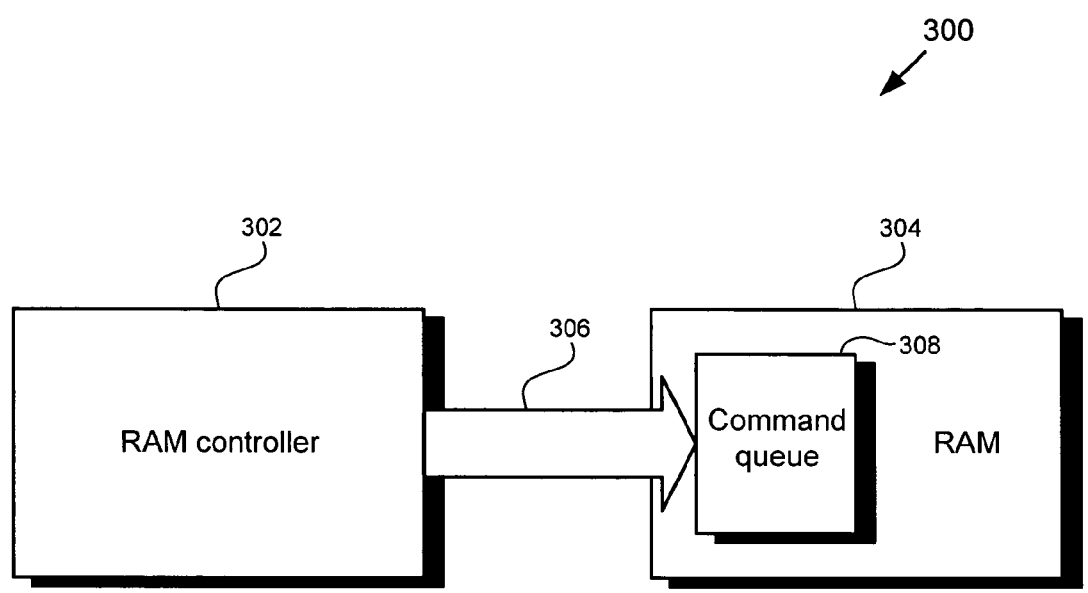
FIG. 3 depicts a circuit diagram of an exemplary RAM employing system according to one embodiment of the present invention.

FIG. 3 shows a block diagram of exemplary RAM employing system 300 according to one embodiment of the present invention. As shown in FIG. 3, RAM employing system 300 includes RAM controller 302 and RAM 304. For example, RAM 304 can be a dynamic random access memory (DRAM). As also shown in FIG. 3, RAM 304 includes command queue 308. Command queue 308 can be, for example, a first-in first-out (FIFO) command queue. As further shown in FIG. 3, RAM controller 302 is coupled to RAM 304 via control bus 306, such that RAM controller 302 can transfer a sequence of RAM commands directly into command queue 308 in RAM 304. Control bus 306 in FIG. 3 can be, for example, a flow controlled bus that causes a phase-shift between the time domain of RAM controller 302 and the time domain of RAM 304.

In RAM employing system 300, each RAM command transferred by RAM controller 302 into command queue 308 is encoded with specific timing information relative to an immediately preceding RAM command. The timing information pertaining to each RAM command is based on the timing of the optimal sequence of RAM commands as determined by RAM controller 302. The timing information can be used to determine an execution delay period between the executions of two consecutive RAM commands, allowing RAM employing system 300 to maintain the optimal sequence and specific timing of the RAM commands transferred by RAM controller 302 to RAM 304.

Figure 4:
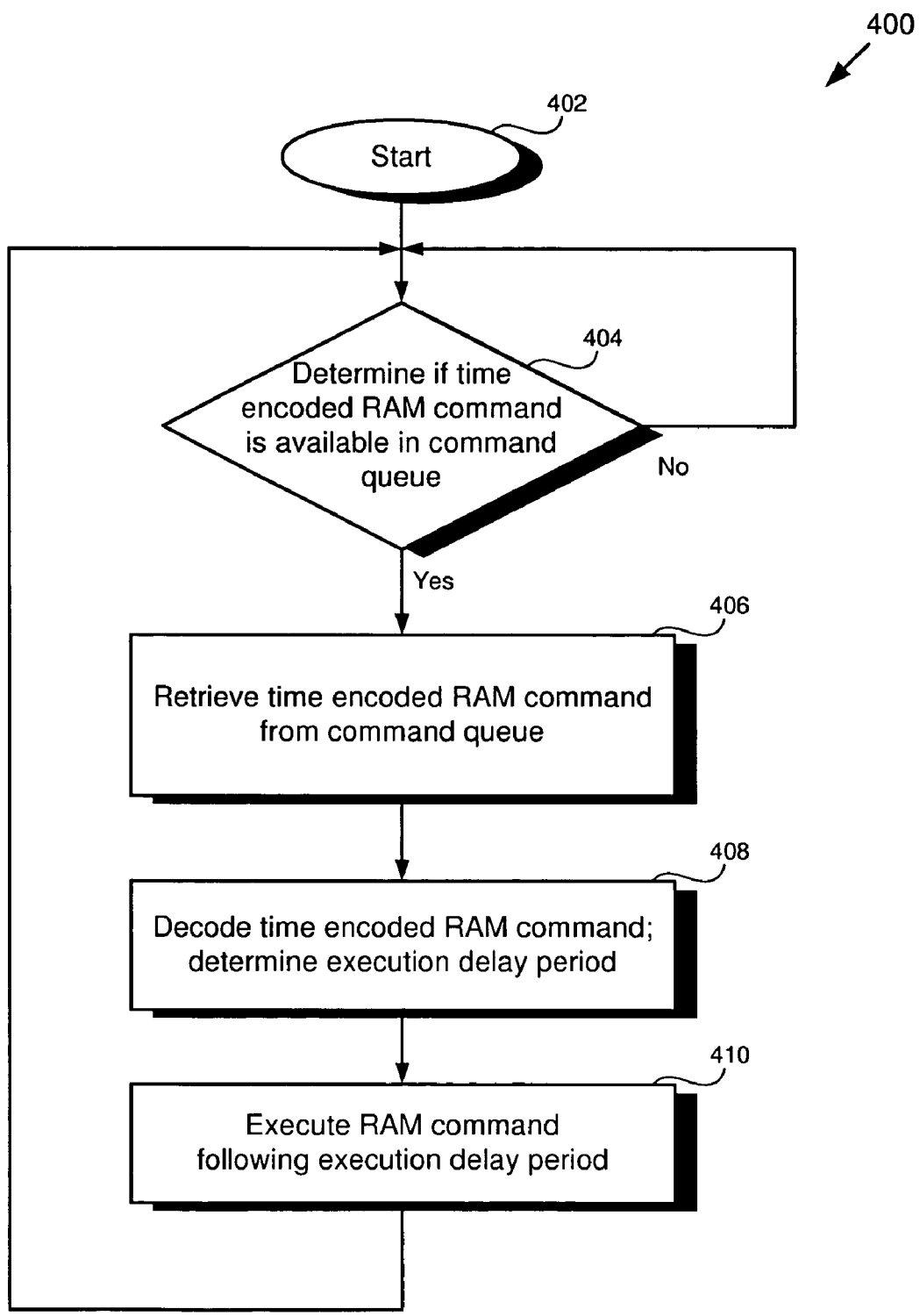
FIG. 4 depicts a flow chart showing an exemplary memory operation for the RAM employing system of FIG. 3 in accordance with one embodiment of the invention.

An exemplary memory operation for RAM employing system 300 in accordance with one embodiment of the invention is represented by flow chart 400 of FIG. 4. Certain details and features have been left out of flow chart 400 of FIG. 4 that are apparent to a person of ordinary skill in the art. For example, a step may consist of one or more sub-steps or may involve specialized circuitry or processing, as known in the art. While steps 402 through 410 shown in flow chart 400 are sufficient to describe one embodiment of the present invention, other embodiments of the invention may utilize steps different from those shown in flow chart 400.

At step 402 of flowchart 400, the exemplary memory operation begins. First at step 402, RAM employing system 300 is powered up to start RAM 304 shown in FIG. 3. Thereafter, at decision step 404, RAM 304 determines whether a time encoded RAM command transferred by RAM controller 302 is available in command queue 308. If a time encoded RAM command is available in RAM command queue 308, then step 406 is carried out; otherwise, step 404 is repeated until a time encoded RAM command is available in command queue 308. At step 406, RAM employing system 304 retrieves the time encoded RAM command from command queue 308.

Thereafter, at step 408, RAM 304 decodes the time encoded RAM command and determines an execution delay period relative to an immediately preceding RAM command. Once the execution delay period is determined, for example, it can be loaded into a counter to provide the required execution delay period before executing the time encoded RAM command. At step 410, RAM 304 executes the time encoded RAM command following the execution delay period determined at step 408. For example, RAM controller 302 may sequentially transfer a first time encoded RAM command, such as "READ A, relative time 0" followed by a second time encoded RAM command, such as "ACT B, relative time 1," to command queue 308. Since RAM command "READ A, relative time 0" is encoded with an execution delay period of "0," it will execute immediately. RAM command "ACT B, relative time 1," however, is encoded with an execution delay period of "1" relative to RAM command "READ A, relative time 0." As such, RAM command "ACT B, relative time 1" will execute one clock cycle after the execution of RAM command "READ A, relative time 0." After executing the time encoded RAM command in step 410, RAM 304 returns to step 404.

Since the invention utilizes a command queue to receive the time encoded RAM commands provided by the RAM controller, both the optimal sequence and the specific timing of the RAM commands determined by the RAM controller are maintained by the RAM, despite the phase-shift between the time domain of the RAM controller and the time domain of the RAM. More specifically, the RAM controller does not have to track the status of the RAM across unknown time domains to enable proper execution of specifically timed RAM commands by the RAM. Therefore, the invention advantageously allows a RAM to receive a sequence of RAM commands from a RAM controller across multiple time domains that may exist between the RAM controller and the RAM, without compromising the performance of the RAM.

The features of the invention discussed above also allow RAMs to be used with low-pin-count, high frequency buses, thereby reducing the overall cost of the system, as well as with high-frequency, low-voltage differential signaling buses to achieve improved noise behavior. In addition, the invention provides much higher RAM performance for pin-limited systems (i.e., systems having approximately 60 to 90 pins), such as those in cell phone devices, than is presently achievable.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

Thus, a system and method for maintaining RAM command timing across phase-shifted time domains has been described.

The invention claimed is:

1. A RAM employing system comprising:
   a RAM coupled to a RAM controller;
   a command queue configured to receive a plurality of time encoded RAM commands from said RAM controller;
   wherein said RAM is configured to retrieve, decode, and execute each of said plurality of time encoded RAM commands in said command queue, and wherein said time encoded RAM commands are transferred to said command queue using a flow-controlled bus, such that a phase-shift results between a time domain of said RAM and a time domain of said RAM controller.

2. The RAM employing system of claim 1, wherein each of said plurality of time encoded RAM commands is encoded with timing information relative to an immediately preceding RAM command in said plurality of time encoded RAM commands.

3. The RAM employing system of claim 2, wherein said timing information is decoded to determine an execution delay period between the execution of a RAM command and said immediately preceding RAM command.

4. The RAM employing system of claim 3, wherein said execution delay period is loaded into a counter to provide the required execution delay period.

5. The RAM employing system of claim 1, wherein said command queue is included in said RAM.

6. The RAM employing system of claim 1, wherein said RAM is a dynamic random access memory (DRAM).

7. The RAM employing system of claim 1, wherein said RAM controller can transfer said plurality of time encoded RAM commands directly into said command queue.

8. The RAM employing system of claim 1, wherein said command queue is a first-in, first-out (FIFO) queue.

9. A method for maintaining random access memory command timing between a RAM controller and a RAM, said RAM including a command queue, said method comprising the steps of:
   receiving a plurality of time encoded RAM commands in said command queue;
   retrieving one of said plurality of time encoded RAM commands from said command queue;
   decoding said one of said plurality of time encoded RAM commands;
   executing said one of said plurality of time encoded RAM commands, wherein said plurality of time encoded RAM commands are transferred to said command queue using a flow controlled bus, such that a phase-shift results between a time domain of said RAM and a time domain of said RAM controller.

10. The method of claim 9, wherein each of said plurality of time encoded RAM commands is encoded with timing information relative to an immediately preceding RAM command in said plurality of time encoded RAM commands.

11. The method of claim 10, wherein said decoding step further comprises decoding said timing information to determine an execution delay period between the execution of said one of said plurality of time encoded RAM commands and said immediately preceding RAM command.

12. The method of claim 11, wherein said execution delay period is loaded into a counter to provide the required execution delay period.

13. The method of claim 9, wherein said RAM controller can transfer said plurality of time encoded RAM commands directly into said command queue.

14. The method of claim 9, wherein said RAM is a dynamic random access memory (DRAM).

15. The method of claim 9, wherein said command queue is a first-in, first-out (FIFO) queue.

* * * * *